(12) United States Patent
Nagao et al.

(10) Patent No.: US 8,985,945 B2
(45) Date of Patent: Mar. 24, 2015

(54) RADIAL GAS EXPANDER

(75) Inventors: Hideki Nagao, Minato-ku (JP); Yasushi Mori, Minato-ku (JP); Masahiro Kobayashi, Minato-ku (JP); Katsuya Yamashita, Minato-ku (JP); Hirotaka Higashimori, Minato-ku (JP); Katsuki Yagi, Minato-ku (JP)

(73) Assignee: Mitsubishi Heavy Industries Compressor Corporation, Tokyo (JP)

( * ) Notice: Subject to any disclaimer, the term of this patent is extended or adjusted under 35 U.S.C. 154(b) by 529 days.

(21) Appl. No.: 13/266,531

(22) PCT Filed: Jul. 28, 2010

(86) PCT No.: PCT/JP2010/062671
§ 371 (c)(1),
(2), (4) Date: Jan. 10, 2012

(87) PCT Pub. No.: WO2011/021483
PCT Pub. Date: Feb. 24, 2011

(65) Prior Publication Data
US 2012/0107108 A1 May 3, 2012

(30) Foreign Application Priority Data

Aug. 19, 2009 (JP) ................. 2009-189670

(51) Int. Cl.
*F01D 5/04* (2006.01)
*F01D 1/08* (2006.01)
*F02C 7/06* (2006.01)

(52) U.S. Cl.
CPC .. *F01D 1/08* (2013.01); *F01D 5/04* (2013.01); *F02C 7/06* (2013.01); *F05D 2220/62* (2013.01)

USPC .............. 415/199.2; 415/206; 415/211.2; 415/229

(58) Field of Classification Search
CPC ......... F01D 9/047; F01D 25/16; F01D 25/24; F01D 5/043; F04D 17/122
USPC ................... 415/199.2, 211.2, 206, 229
See application file for complete search history.

(56) References Cited

U.S. PATENT DOCUMENTS 1,580,878 A * 4/1926 Dufour ................ 417/348
1,793,179 A * 2/1931 Lanterman et al. ............ 415/87

(Continued)

FOREIGN PATENT DOCUMENTS

| CN | 101324193 | 12/2008 |
|----|-----------|---------|
| DE | 174673 | 9/1904 |

(Continued)

OTHER PUBLICATIONS

International Search Report issued Sep. 21, 2010 in International (PCT) Application No. PCT/JP2010/062671 w/partial English translation.

(Continued)

*Primary Examiner* — Ninh H Nguyen
(74) *Attorney, Agent, or Firm* — Wenderoth, Lind & Ponack, L.L.P.

(57) ABSTRACT

Provided is a uni-axial multi-stage radial gas expander which has a high degree of reliability and which can sufficiently cope with the conditions of a high pressure and a high pressure ratio. Two or more radial gas expander sections (11A, 11B) formed of two-or-more-stage impeller vanes (14a to 14h) arranged between bearings (21a, 21b) on a rotor shaft (13) consisting of a single shaft are housed in a signal casing (10).

2 Claims, 4 Drawing Sheets

(56) References Cited

U.S. PATENT DOCUMENTS

| | | | |
|---|---|---|---|
| 1,837,873 A | | 12/1931 | Macmeeken |
| 1,896,809 A | * | 2/1933 | Bentley .................... 415/187 |
| 2,161,695 A | | 6/1939 | Bigelow et al. |
| 3,099,221 A | | 7/1963 | Thompson |
| 3,103,892 A | | 9/1963 | McFarland |
| 3,153,383 A | | 10/1964 | Pilarczyk |
| 3,229,642 A | | 1/1966 | Lobanoff et al. |
| 4,155,684 A | * | 5/1979 | Curiel et al. ............ 417/409 |
| 5,490,760 A | | 2/1996 | Kotzur |
| 6,568,904 B1 | * | 5/2003 | Ueyama et al. ........ 415/199.2 |

FOREIGN PATENT DOCUMENTS

| | | |
|---|---|---|
| DE | 733418 | 3/1943 |
| FR | 355886 | 11/1905 |
| FR | 1326858 | 5/1963 |
| GB | 956732 | 4/1964 |
| JP | 12555 | 7/1907 |
| JP | 60-180800 | 11/1985 |
| JP | 3-168304 | 7/1991 |
| JP | 6-193585 | 7/1994 |
| JP | 3457828 | 10/2003 |
| RU | 2 111 384 | 5/1998 |

OTHER PUBLICATIONS

Written Opinion of the International Searching Authority issued Sep. 21, 2010 in International (PCT) Application No. PCT/JP2010/062671 w/partial English translation.

Japanese Office Action issued Oct. 18, 2011 in corresponding Japanese Patent Application No. 2009-189670 w/English translation.

Russian Office Action dated May 6, 2013 in corresponding Russian Patent Application No. 2011143935 with English translation.

Chinese Office Action issued May 16, 2014 in Chinese Patent Application No. 201080019084.3 with English translation.

Extended European Search Report issued Dec. 5, 2014 in corresponding European Application No. 10809828.6.

Russian Decision on Grant issued Jan. 16, 2015 in corresponding Russian Patent Application No. 2011143935/06 with English translation.

* cited by examiner

RADIAL GAS EXPANDER

TECHNICAL FIELD

This invention relates to a radial gas expander having impeller vanes arranged in multiple stages on a single shaft.

BACKGROUND ART

A gas expander is used for the purpose of sucking a high-pressure gas discharged from a plant, and expanding it to convert the pressure energy of the gas into velocity energy (mechanical energy), thereby recovering power, and decreasing power of a drive motor or the like. This is well known from Patent Document 1, etc.

There may be a case where the gas expanders need to be provided in multiple stages in order to accommodate (absorb) a high pressure ratio or achieve high performance. In this case, a radial gas expander of a geared type (speed increasing gear type) as shown, for example, in FIG. 4 is conceivable (see Patent Document 2).

According to this radial gas expander, an expander wheel shaft 102 is supported by a gear casing 100 via bearings 101A. Also, a plurality of expander pinion shafts (impeller shafts) 103 parallel to the expander wheel shaft 102 are supported by the gear casing 100 via bearings 101B. Expander impellers (impeller vanes) 104 of high-pressure stages A, B and C, D are arranged at both ends of one of the illustrated expander pinion shafts 103, while expander impellers (impeller vanes) 104 of low-pressure stages E and F are arranged at both ends of the other expander pinion shaft 103.

In each stage, a high-temperature high-pressure gas discharged from a plant is sucked toward the expander impellers 104 from an inflow casing 105 constituted as a spiral casing, and guide vanes (nozzle blades) 107 provided in a disk-shaped annular space 106. Thus, the gas is expanded, and discharged from an outlet conical diffuser 108. Power recovered by sucking and expanding the gas is transmitted to the expander wheel shaft 102 via a gear train to decrease the power of a drive motor or the like (not shown). On the one expander pinion shaft 103, the gas exiting from the first-stage expander impeller 104 is sucked into the second-stage expander impeller 104 via a return ring (return bend) 109 so that the suction and expansion process for the gas is repeated in the two stages.

PRIOR ART DOCUMENTS

Patent Documents

Patent Document 1: Japanese Patent No. 3457828 (page 2, FIG. 6)
Patent Document 2: JP-A-6-193585 (page 7, FIG. 24)
Patent Document 3: JP-A-3-168304 (page 1, FIG. 1)

SUMMARY OF THE INVENTION

Problems to be Solved by the Invention

With the radial gas expander of the geared type as shown in FIG. 4, however, the number of the expander pinion shafts (impeller shafts) 103 is increased as the number of the stages increases. Accordingly, a plurality of high-pressure seals and a plurality of high-pressure casings are required.

Thus, there are many factors behind concern over the reliability of the machine under high pressure and high-pressure ratio conditions, such as gas leaks or shaft vibrations, thus posing the problem that it has been difficult to ensure reliability.

As for the radial gas expander shown in FIG. 4, the radial gas expanders of the high-pressure two stages A, B and C, D are provided at both ends of the one expander pinion shaft 103. They are both supported in a so-called cantilevered manner on a free end side of the expander pinion shaft 103 located outwardly of the bearing 101B. Thus, shaft vibrations increase, and the two stages are the limit for acceptance. Since more stages are unacceptable, the radial gas expander has the drawback that it cannot withstand use under the high pressure, high-pressure ratio conditions.

It is an object of the present invention, therefore, to provide a highly reliable single-shaft (or uniaxial) multistage radial gas expander capable of withstanding use under high pressure, high-pressure ratio conditions.

Patent Document 3 discloses an electric power generation apparatus having gas expanders arranged in multiple stages on a rotor. This apparatus is an axial gas expander, which differs from a radial gas expander in the level of pressure and which cannot be applied at all under high pressure, high-pressure ratio conditions.

Means for Solving the Problems

A radial gas expander according to the present invention, for attaining the aforementioned object, comprises:
a radial gas expander section housed in a single casing,
the radial gas expander section including impeller vanes arranged in two or more stages between bearings on a single shaft.

The radial gas expander section may be provided to include a plurality of diaphragms connected in an axial direction, each of the diaphragms having a return bend formed to connect the adjacent stages, each of the return bends being fitted with a nozzle blade for forming a gas flow corresponding to a profile of the impeller vane, and a return vane for conditioning the gas flow to an entrance of the next stage into an efficient gas flow.

Two or more of the radial gas expander sections maybe provided, and each of the sections may have a gas inlet communicating with a suction port of the single casing, and a gas outlet communicating with a delivery port of the single casing.

Effects of the Invention

According to the above-described radial gas expander of the present invention, the single shaft is sufficient, although the multiple stages are used. As compared with the conventional geared type radial gas expander or the like, therefore, the numbers of the high-pressure seals and the high-pressure casings can be minimized. Furthermore, the radial gas expander sections are provided between the bearings on the single shaft. Thus, consideration of shaft alignment is easy compared with a plurality of shafts, and design of shaft vibration is also easy in comparison with a cantilevered radial gas expander section. In addition, the single casing suffices, and thus can be supported easily at the position of the shaft center line.

Consequently, the factors behind concern over the reliability of the machine under high pressure and high-pressure ratio conditions, such as gas leaks or shaft vibrations, are removed, and a more reliable single-shaft (or uniaxial) multistage radial gas expander is realized.

MODE FOR CARRYING OUT THE INVENTION

Hereinafter, a radial gas expander according to the present invention will be described in detail by an embodiment with reference to the accompanying drawings.

Embodiment

Figure 1:
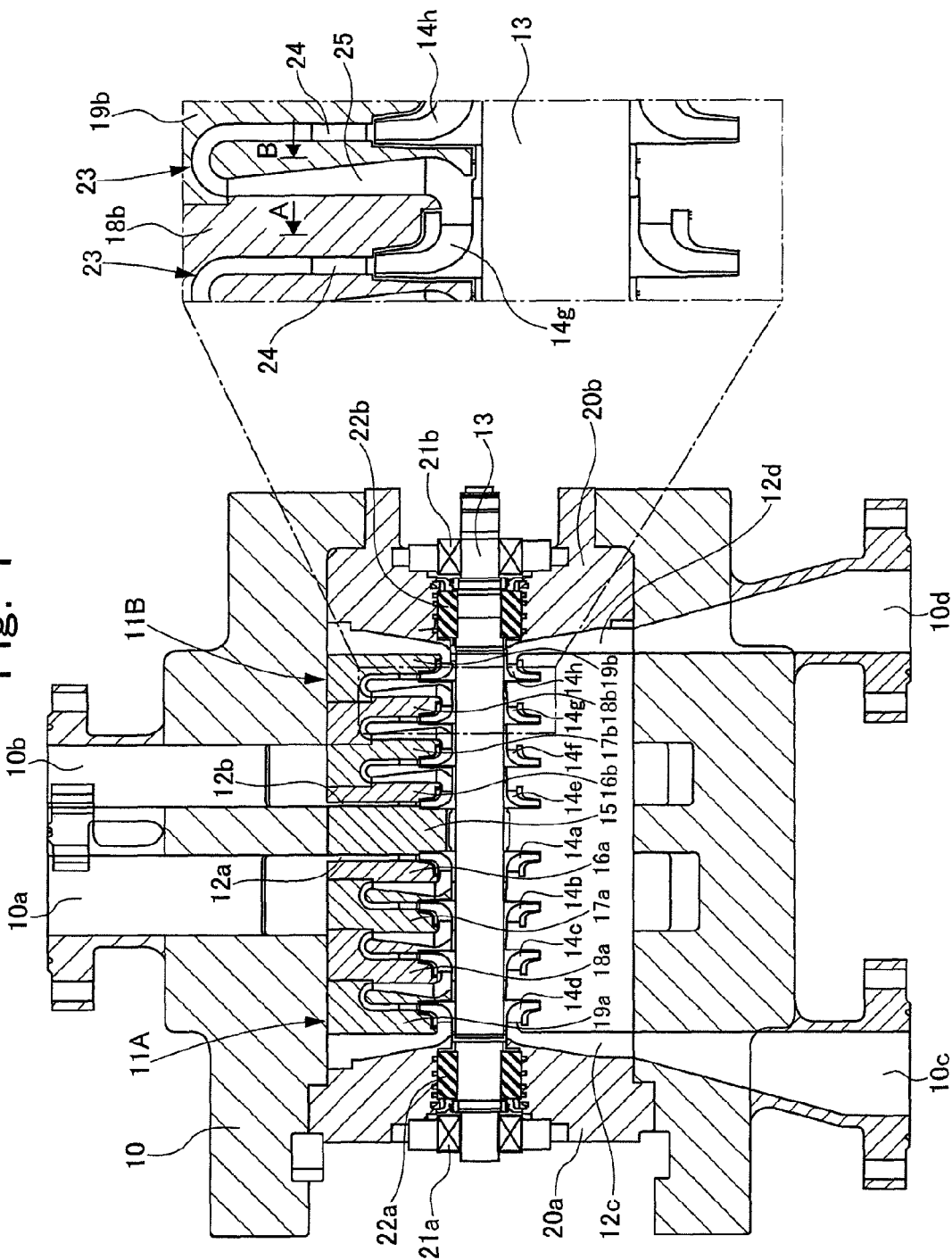
[FIG. 1] is a front sectional view of a single-shaft (or uniaxial) multistage radial gas expander showing an embodiment of the present invention.
Figure 2:
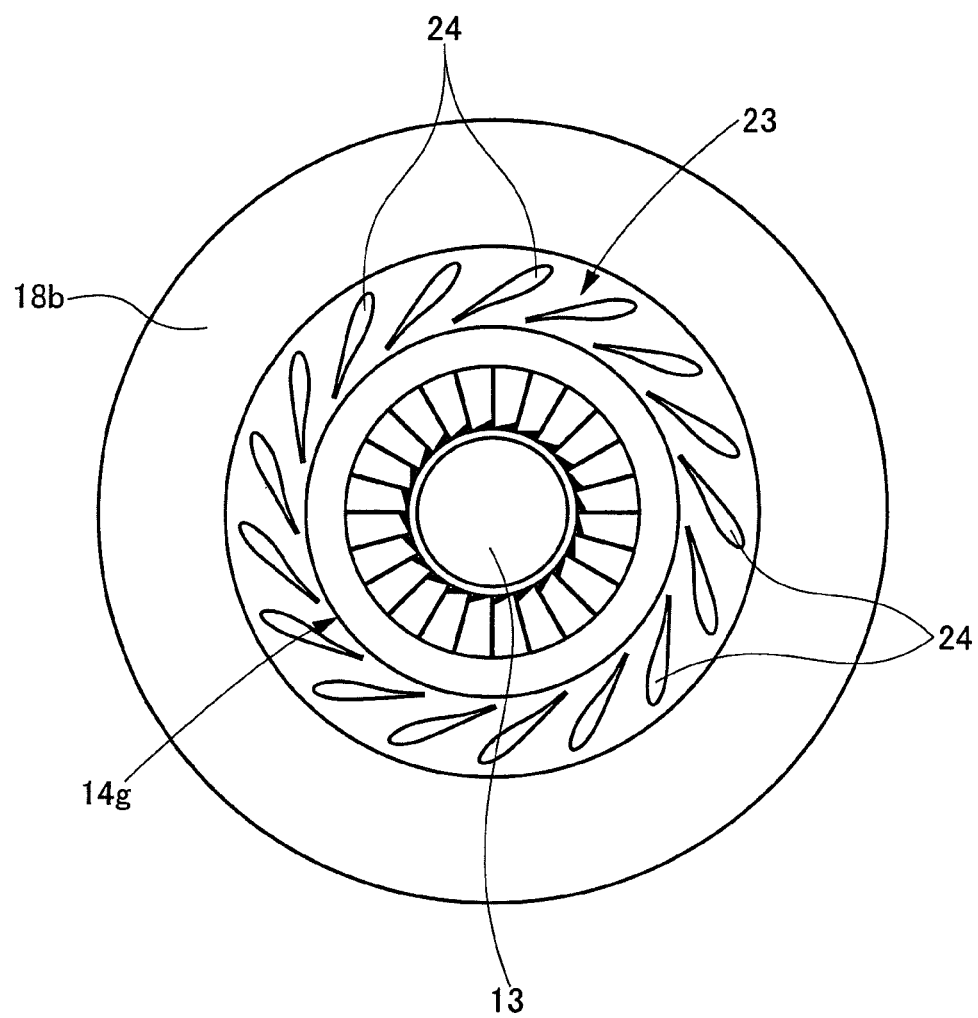
[FIG. 2] is a view, taken along an arrow A, of a diffuser in FIG. 1.
Figure 3:
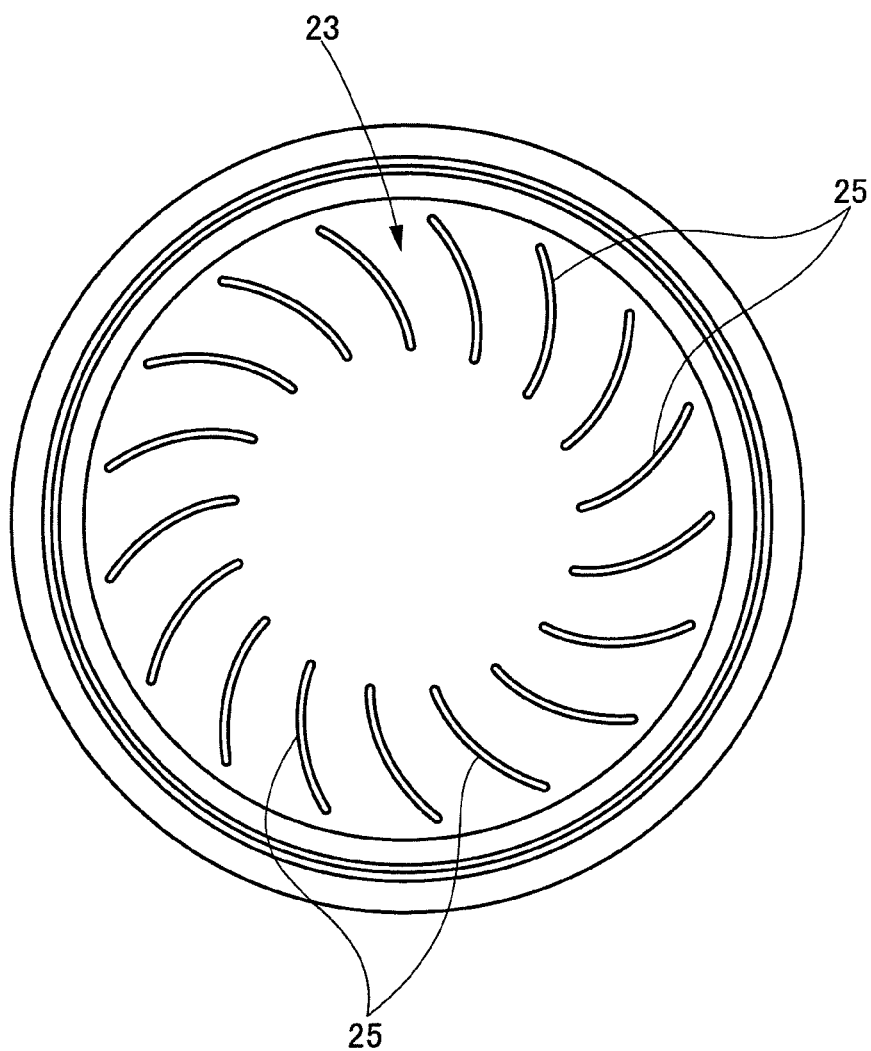
[FIG. 3] is a view, taken along an arrow B, of the diffuser in FIG. 1.
Figure 4:
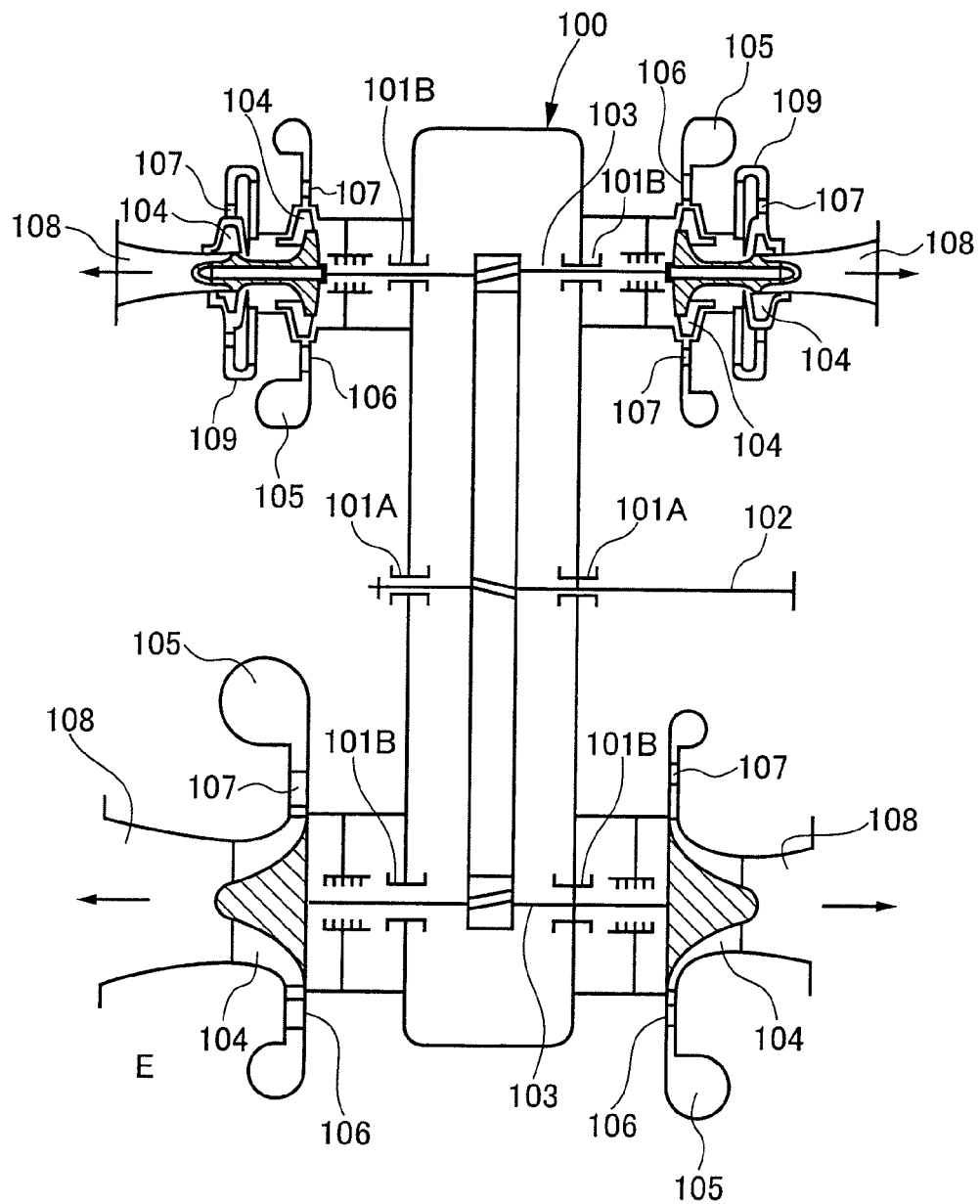
[FIG. 4] is a front sectional view of a conventional radial gas expander of a geared type.

FIG. 1 is a front sectional view of a uniaxial multistage radial gas expander showing an embodiment of the present invention. FIG. 2 is a view, taken along an arrow A, of a diffuser in FIG. 1. FIG. 3 is a view, taken along an arrow B, of the diffuser in FIG. 1.

As shown in FIG. 1, two radial gas expander sections 11A and 11B, whose gas flow directions are opposite to each other in the direction of a rotor shaft, are housed in a single shell-shaped (tubular) casing 10. A suction port 10a communicating with a gas inlet (port) 12a of one of the radial gas expander sections, 11A, and a suction port 10b communicating with a gas inlet (port) 12b of the other radial gas expander section 11B are formed in the shell-shaped casing 10. Also, a delivery port 10c communicating with a gas outlet (port) 12c of the one radial gas expander section 11A, and a delivery port 10d communicating with a gas outlet (port) 12d of the other radial gas expander section 11B are formed in the shell-shaped casing 10.

The two radial gas expander sections 11A and 11B have a plurality of (eleven in the illustrated embodiment) diaphragms (annular disk-shaped partition plates) 15, 16a, 16b, 17a, 17b, 18a, 18b, 19a, 19b, 20a and 20b connected releasably in the longitudinal direction of the shell-shaped casing 10. The central diaphragm 15 and the five diaphragms 16a, 17a, 18a, 19a and 20a located on one side thereof (leftward in the drawing) constitute the one radial gas expander section 11A, whereas the central diaphragm 15 and the five diaphragms 16b, 17b, 18b, 19b and 20b located on the other side thereof (rightward in the drawing) constitute the other radial gas expander section 11B.

That is, a rotor shaft 13 composed of a single shaft penetrates the center of each of the diaphragms 15, 16a, 16b, 17a, 17b, 18a, 18b, 19a, 19b, 20a and 20b, and both ends of the rotor shaft 13 are rotatably supported via bearings 21a and 21b by the two diaphragms 20a and 20b which concurrently serve as end plates in the two radial gas expander sections 11A and 11B. Dry gas seals 22a and 22b are fitted in inner peripheral portions of the diaphragms 20a and 20b located inwardly of the bearings 21a and 21b.

On the rotor shaft 13, impeller vanes 14a to 14d in a plurality of stages (four stages in the illustrated embodiment) for the one radial gas expander section 11A, and impeller vanes 14e to 14h in a plurality of stages (four stages in the illustrated embodiment) for the other radial gas expander section 11B are arranged, with the direction of the former vanes and the direction of the latter vanes being opposite to each other.

Moreover, the gas inlets 12a, 12b communicating with the suction ports 10a, 10b mentioned above are formed between the contact surfaces of the central diaphragm 15 and the diaphragms 16a, 16b located on both sides thereof, while the gas outlets 12c, 12d communicating with the delivery ports 10c, 10d mentioned above are formed between the contact surfaces of the two diaphragms 20a, 20b, as the end plates, and the diaphragms 19a, 19b adjacent thereto.

Return bends (intermediate channels) 23 of a U-shaped cross section connecting the stages are formed in the intermediate diaphragms 17a, 18a, 19a and 17b, 18b, 19b in the radial gas expander sections 11A, 11B, as shown in FIGS. 2 and 3. These return bends 23 are fitted with a plurality of (seventeen in the illustrated embodiment) nozzle blades 24 for forming a gas flow corresponding to the profiles of the impeller vanes 14b to 14d and 14f to 14h, and a plurality of (seventeen in the illustrated embodiment) return vanes 24 for conditioning the gas flow to the entrance of the next stage into an efficient gas flow. It goes without saying that the aforementioned gas inlets 12a, 12b are also fitted with nozzle blades 24 for forming a gas flow corresponding to the profiles of the impeller vanes 14a, 14e.

In the present radial gas expander, configured as above, when a high-temperature, high-pressure gas discharged from a plant is supplied to the suction ports 10a, 10b of the single casing 10, for example, the radial gas expander sections 11A, 11B allow the impeller vanes 14a to 14d and 14e to 14h, both in the four stages, to repeat suction and expansion of the gas throughout the four stages, thereby recovering power and decreasing the power of the drive motor or the like for driving the rotor shaft 13. In the present embodiment, since the two radial gas expander sections 11A and 11b are present, a power decreasing effect corresponding to the sum of their effects is obtained.

In the present embodiment, moreover, a single shaft is sufficient as the rotor shaft 13, although the multiple stages (strictly, eight stages) are used. As compared with the conventional geared type radial gas expander or the like, therefore, a minimum number of dry gas seals are sufficient (namely, the two dry gas seals 22a and 22b), and the casing 10 may be a single casing which can be easily supported.

Furthermore, the two radial gas expander sections 11A and 11B are provided between the bearings 22a and 22b on the single rotor shaft 13. Thus, consideration of shaft alignment is easy compared with plural shafts, and design of shaft vibration is also easy in comparison with a cantilevered radial gas expander section.

Besides, the two radial gas expander sections 11A and 11B are provided to have the plurality of diaphragms 15, 16a, 16b, 17a, 17b, 18a, 18b, 19a, 19b, 20a and 20b (where the return bends 23, etc. connecting the stages are formed) connected in the axial direction. Thus, the radial gas expander sections 11A, 11B can be firmly and easily assembled within the single casing 10.

Further, the two radial gas expander sections 11A and 11B allow the gas to flow in directions opposite to each other. Thus, they can cancel out each other's pressure, rendering a thrust acting on the rotor shaft 13 well-balanced.

In addition, the two radial gas expander sections 11A and 11B, respectively, have the gas inlets 12a and 12b communicating with the suction ports 10a and 10b of the single casing 10, and the gas outlets 12c and 12d communicating with the delivery ports 10c and 10d of the single casing 10. Thus, it is easy to change the number of the sections.

Consequently, the factors behind concern over the reliability of the machine under high pressure and high-pressure ratio conditions, such as gas leaks or shaft vibrations, are removed, and a more reliable uniaxial multistage radial gas expander is realized.

It goes without saying that the present invention is not limited to the above embodiment, and various changes and modifications, such as a change in the number of the radial gas expander sections and a change in the number of the stages of the radial gas expander, may be made without departing from the gist of the present invention.

Industrial Applicability

The radial gas expander according to the present invention can be applied to a plant or the like which sucks a high-pressure gas discharged from the plant, expands the gas to recover power, and utilizes an exhaust gas, whose temperature has become low upon expansion, for a reheat cooler.

EXPLANATIONS OF LETTERS OR NUMERALS

10 Single casing
10a, 10b Suction port
10c, 10d Delivery port
11A, 11B Radial gas expander section
12a, 12b Gas inlet
13 Rotor shaft
14a to 14h Impeller vane
15 Central diaphragm
16a, 16b, 17a, 17b, 18a, 18b, 19a, 19b Intermediate diaphragm
20a, 20b Diaphragm as end plate
21a, 21b Bearing
22a, 22b Dry gas seal
23 Return bend (intermediate channel)
24 Nozzle blade
25 Return vane

The invention claimed is:

1. A radial gas expander, comprising:
two or more radial gas expander sections housed in a single casing, wherein
the radial gas expander sections include impeller vanes arranged in two or more stages between bearings on a single shaft, and
each of the radial gas expander sections has a gas inlet communicating with a suction port of the single casing, and a gas outlet communicating with a delivery port of the single casing.

2. The radial gas expander according to claim 1, wherein
each of the radial gas expander sections includes a plurality of diaphragms connected in an axial direction,
each of the diaphragms has a return bend formed to connect adjacent stages, and
each of the return bends is fitted with a nozzle blade for forming a gas flow corresponding to a profile of an impeller vane, and a return vane for conditioning the gas flow to an entrance of a next stage into an efficient gas flow.

* * * * *